(12) United States Patent
Itaya et al.

(10) Patent No.: US 11,119,452 B2
(45) Date of Patent: Sep. 14, 2021

(54) EQUIPMENT MANAGEMENT SYSTEM

(71) Applicant: NATIONAL INSTITUTE OF INFORMATION AND COMMUNICATIONS TECHNOLOGY, Koganei (JP)

(72) Inventors: Satoko Itaya, Tokyo (JP); Fumihide Kojima, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 388 days.

(21) Appl. No.: 16/070,975

(22) PCT Filed: Jan. 17, 2017

(86) PCT No.: PCT/JP2017/001341
§ 371 (c)(1),
(2) Date: Jul. 18, 2018

(87) PCT Pub. No.: WO2017/126491
PCT Pub. Date: Jul. 27, 2017

(65) Prior Publication Data
US 2019/0243315 A1     Aug. 8, 2019

(30) Foreign Application Priority Data

Jan. 20, 2016   (JP) .............................. JP2016-008722

(51) Int. Cl.
*G05B 13/02* (2006.01)
*G06Q 50/04* (2012.01)
(Continued)

(52) U.S. Cl.
CPC ....... *G05B 13/0205* (2013.01); *G05B 19/418* (2013.01); *G05B 19/4185* (2013.01);
(Continued)

(58) Field of Classification Search
USPC ....................................................... 700/51
See application file for complete search history.

(56) References Cited

U.S. PATENT DOCUMENTS

| 10,389,174 B2 * | 8/2019 | Itaya ..................... H02J 9/061 |
| 2007/0072547 A1 * | 3/2007 | Sims, III ............. G06Q 10/087 |
| | | 455/39 |
| 2017/0047775 A1 | 2/2017 | Itaya et al. |

FOREIGN PATENT DOCUMENTS

| JP | 2000039901 A | 2/2000 |
| JP | 2000207019 A * | 7/2000 |

(Continued)

OTHER PUBLICATIONS

International Search Report (ISR) dated Apr. 11, 2017 issued in International Application No. PCT/JP2017/001341.
(Continued)

*Primary Examiner* — Mohammad Ali
*Assistant Examiner* — Joshua T Sanders
(74) *Attorney, Agent, or Firm* — Holtz, Holtz & Volek PC

(57) ABSTRACT

An equipment management system includes an adaptive system control unit which is assigned to at least one piece of equipment installed in a plant and which monitors and controls the equipment via wireless communication. The adaptive system control unit includes an information detection unit for detecting information from the equipment, a detected information control unit for guaranteeing that only acquisition intended information previously intended to be acquired in the information detected by the information detection unit is acquired by the adaptive system control unit, a first data propagation adjustment unit for adjusting a propagation path when transmitting data including information controlled by the detected information control unit to the outside, and an equipment control unit for controlling the equipment on the basis of the information detected by the information detection unit or a control policy from the outside.

8 Claims, 10 Drawing Sheets

(51) Int. Cl.
  *G05B 19/418* (2006.01)
  *H04L 12/00* (2006.01)
  *G05B 23/02* (2006.01)
  *H04L 12/40* (2006.01)

(52) U.S. Cl.
  CPC ............ *G05B 23/02* (2013.01); *G06Q 50/04* (2013.01); *H04L 12/00* (2013.01); *H04L 12/40136* (2013.01); *G05B 2219/31174* (2013.01); *Y02P 90/02* (2015.11); *Y02P 90/30* (2015.11); *Y02P 90/60* (2015.11)

(56) References Cited

FOREIGN PATENT DOCUMENTS

| | | | |
|---|---|---|---|
| JP | 2000207019 A | | 7/2000 |
| JP | 2012178110 A | * | 9/2012 |
| JP | 2012178110 A | | 9/2012 |
| JP | 2015208104 A | | 11/2015 |
| WO | 2015159555 A1 | | 10/2015 |

OTHER PUBLICATIONS

Written Opinion dated Apr. 11, 2017 issued in International Application No. PCT/JP2017/001341.
Satoko Itaya, et al., "Proposal for Framework to realize Manufacturing On-Demand Service: Smart Resource Flow", IEICE Technical Report RCC2014-55 (Nov. 2014).
Satoko Itaya, et al., "Communication Technology for Cloud Utility Management: Study on Smart Resource Flow", IEICE Technical Report RCS2014-95 (Jul. 2014).
Satoko Itaya, et al., "Experiments of Wireless Communications in the Manufacturing Field: Evaluation of Communication Quality using 920 MHz Band", IEICE Technical Report RCS2015-157 (Oct. 2015).
Satoko Itaya, et al., "Experiments of Wireless Communication in the Manufacturing Field: Toward Flexible Factory", IEICE Technical Report RCS2015-156 (Oct. 2015).
Japanese Office Action dated Feb. 4, 2020 (and English translation thereof) issued in Japanese Application No. 2012-178110.

* cited by examiner

EQUIPMENT MANAGEMENT SYSTEM

TECHNICAL FIELD

The present invention relates to an equipment management system for monitoring and controlling one or more pieces of equipment installed in a plant via wireless communication.

BACKGROUND ART

In recent years, domestic manufacturing has been increasingly shifted to overseas manufacturing in the manufacturing industry in Japan in order to cope with the entry into the global market or the price competition. Thus, it is an important issue to keep manufacturing scenes and manufacturing techniques in Japan in order to enhance international competitiveness. There is required a system capable of responding to sequential changes of production lines, and change of inspection equipment depending on change of production lines in order to respond to the requests of reduction in product manufacturing cycle and limited production of diversified products. Productions lines are changed in many cases on the basis of a change in the number of products, a change in products, an improvement in production steps, or the like, and the arrangement of equipment or the construction of production lines requires flexibility in terms of improvement in productivity.

On the other hand, manufacturing equipment and inspection equipment have been generally managed via wired communication in terms of control reliability. However, the management via wired communication causes a step of rewiring a wired network on each change of production lines, which requires higher working cost and longer working time. Thus, control and management of manufacturing equipment and inspection equipment in a plant, which has been mainly performed via wired communication, need to be performed via wireless communication in order to pursue flexibility in the arrangement of equipment and the construction of production lines.

However, the wireless management of manufacturing equipment and inspection equipment has been taken per individual piece of equipment, but assuming the total manufacturing scenes in a plant as one system at present and in the future, the use of an optimum wireless communication technique and the distribution of communication resources can be hardly realized in the system. Thus, if the same frequency band is used between wireless management systems individually introduced per individual piece of equipment, a communication interference can be caused or a failure can be caused. In such a situation, there is a problem that wireless management of equipment cannot be taken newly as intended.

Further, if wired communication for controlling and managing manufacturing equipment and inspection equipment in a plant, which has been mainly made, is changed to wireless communication, available frequency bands are limited and the same frequency has to be used between systems, and thus shared frequency or mutual interference, which has not been considered, has to be considered. Further, it is predicted that information to be newly detected via wireless communication in the total manufacturing scenes increases to several tens of thousands of times in the future. There is desired a system capable of flexibly changing a communication frequency when changed to wireless communication while the number of automatic guided vehicles (AGV) in manufacturing scenes is increasing in the future.

It is therefore necessary to construct a flexible equipment management system capable of selecting a wireless communication system, a frequency, and the like depending on an application in a manufacturing scene as intended, capable of realizing design and management of manufacturing equipment and inspection equipment on the basis of an application, and capable of adapting to environments changing over time.

Conventionally, Non-Patent literatures 1 to 4 disclose a concept of On-Demand Manufacturing, for example, in order to solve the above problems. In order to realize the function of On-Demand Manufacturing, there is configured a system with three layers of components including service manager (SM), field manager (FM), and flexible system manager (FSM: adaptive system control unit) from the highest layer, in which a series of managements including detecting information, analyzing data, and controlling is cooperatively performed between the layers.

The SM has a function of managing openability/closability and quantitation property of information in the entire system. The SM manages one or more FMs under control of the SM. The FM has a function of realizing openability/closability and quantitation property in units of on-scene plant. The FM controls the FSM under control of the FM.

The FSM is assigned to one or two or more pieces of equipment installed in a plant, and serves to realize openability/closability and flexibility for each piece of equipment. That is, the FSM detects various items of information from the assigned equipment via a wireless signal, and transmits a wireless signal to the equipment and controls it. In particular, the FSM controls the equipment on the basis of a local service policy designated by the FM. Further, the FSM determines a communication system, a communication frequency, and the like for controlling the equipment on the basis of a local communication policy depending on a service type. Various data sizes, data generation frequencies, numbers of nodes, and the like are actually handled by the equipment used in the manufacturing scenes in the plant, and an optimum communication system, communication frequency, and the like are selected according to the characteristics of an application in the communication environment. For selection of a communication system and the like, an optimum system is determined on the basis of a communication policy per service type previously defined for a plurality of types, and information detected from the equipment by the FSM or FM.

A wireless communication system, a frequency, and the like can be efficiently selected depending on an application in a manufacturing scene in this way, thereby enhancing flexibility of the entire system.

CITATION LIST

Patent Literature

Patent Literature 1: JP 2015-208104 A

Non Patent Literature

Non Patent Literature 1: Satoko Itaya, et al., "Proposal for Framework to realize Manufacturing On-Demand Service: Smart Resource Flow", IEICE Technical Report RCC2014-55 (2014-11)

Non Patent Literature 2: Satoko Itaya, el al., "Communication Technology for Cloud Utility Management: Study on Smart Resource Flow", IEICE Technical Report RCS2014-95 (2014-07)

Non Patent Literature 3: Satoko Itaya, et al., "Experiments of Wireless Communications in the Manufacturing Field: Evaluation of Communication Quality using 920 MHz Band", IEICE Technical Report RCS2015-157(2015-10)

Non Patent Literature 4: Satoko Itaya, et al., "Experiments of Wireless Communication in the Manufacturing Field: Toward Flexible Factory", IEICE Technical Report RCS2015-156 (2015-10)

SUMMARY OF INVENTION

Technical Problem

Information handled with the concept of On-Demand Manufacturing can be largely divided into information for controlling equipment and information detected from the equipment and reflected on improvements in work in the future. The information detected from the equipment is largely classified into information to be acquired (which will be denoted as acquisition intended information below)) and information not to be acquired (which will be denoted as acquisition non-intended information below). The acquisition intended information is desired to acquire by a client who runs a plant, such as noises of a motor or the number of vibrations, and is generally predefined according to client's intention and notification of which is provided to the system manager. To the contrary, the acquisition non-intended information is all the information except the acquisition intended information. The system manager really wants to avoid the acquisition non-intended information from being detected since the detection leads to contract violation with the client who runs the plant.

Additionally, even if only the acquisition intended information can be detected, a leak of the information to outsiders can wreak tremendous damage on the client. On-Demand Manufacturing assumes that the acquisition intended information is transmitted from the FSM to the FM and the SM, and the information needs to be propagated in an appropriate communication path in order to keep the information in the company without leaking to the outside.

Conventionally, in Patent Literature 1, there has been conventionally proposed a technique in which a system is configured of three layers of FSM, FM, and SM with the concept of On-Demand Manufacturing and which responds to dynamic changes of loads or failures with particular emphasis on management of power supply (resource supply).

However, Patent Literature 1 does not particularly disclose control for guaranteeing that only the acquisition intended information is detected and control of an optimum communication path for data to be transmitted.

Thus, the present invention has been made in terms of the above problems, and it is an object thereof to provide an equipment management system for monitoring and controlling one or more pieces of equipment installed in a plant via wireless communication, the equipment management system being capable of effectively realizing control for guaranteeing that only acquisition intended information is detected and control of an appropriate communication path for data to be transmitted with the concept of On-Demand Manufacturing.

Solution to Problem

An equipment management system of a first invention includes an adaptive system control unit which is assigned to one or more pieces of equipment installed in a plant and which monitors and controls the equipment via wireless communication, wherein the adaptive system control unit has: an information detection means for detecting information from the equipment; a detected information control means for guaranteeing that only acquisition intended information which is previously intended to be acquired in the information detected by the information detection means is acquired by the adaptive system control unit; a first data propagation adjustment means for adjusting a propagation path when transmitting data including information controlled by the detected information control means to the outside; and an equipment control means for controlling the equipment on the basis of the information detected by the information detection means or a control policy from the outside.

The equipment management system of a second invention, in the first invention, further includes: a field manager which is assigned in units of plant and manages one or more adaptive system control units, wherein the field manager has: a second data propagation adjustment means for adjusting a propagation path for the data transmitted to the first data propagation adjustment means in an adaptive system control unit under control of the field manager; an operation information acquisition means for acquiring operation information in units of plant; and a local policy control means for generating a local communication policy or local service policy on the basis of at least one of the operation information acquired by the operation information acquisition means, the data transmitted from the adaptive system control unit, and a service policy transmitted from the outside, and transmitting the local communication policy or local service policy to the adaptive system control unit, and the information detection means in the adaptive system control unit controls communication with the equipment on the basis of the local communication policy transmitted from the field manager, or controls the equipment on the basis of the local service policy transmitted from the field manager.

The equipment management system of a third invention, in the second invention, further includes: a service manager for managing one or more field managers, wherein the service manager has: a third data propagation adjustment means for adjusting a propagation path for the data transmitted to the second data propagation adjustment means in a field manager under control of the service manager; and a service policy generation means for generating the service policy and transmitting the service policy to the field manager.

According to the equipment management system of a fourth invention, in the third invention, the service policy generation means sets the information which is previously intended to be acquired, and includes the information in the service policy to be transmitted to the field manager.

According to the equipment management system of a fifth invention, in any one of the first invention to the fourth invention, when the information detected by the information detection means is other than the information which is previously intended to be acquired, the detected information control means does not transmit the information to the outside.

According to the equipment management system of a sixth invention, in any one of the first invention to the fifth invention, the equipment control means in the adaptive system control unit statistically analyzes the information detected by the information detection means, and controls the equipment on the basis of the analysis result, or sets a condition for making communication with the equipment.

Advantageous Effects of Invention

According to the thus-configured present invention, it is possible to effectively realize control for guaranteeing that only acquisition intended information is detected and control of an appropriate communication path for data to be transmitted with the concept of On-Demand Manufacturing in an equipment management system for monitoring and controlling one or more pieces of equipment installed in a plant via wireless communication.

DESCRIPTION OF EMBODIMENTS

An embodiment of an equipment management system according to the present invention will be described below in detail with reference to the drawings.

An equipment management system according to the present invention operates with the concept of On-Demand Manufacturing. In the On-Demand Manufacturing, there are mounted three basic functions including "openability/closability" that a necessary item can be accessed when needed while a confidential item can be accurately protected, "flexibility" that a necessary item can be manufactured when and where needed and its layout can be easily changed, and "quantitation property" that desired information can be collected with necessary accuracy and a determination based on a policy can be made.

Figure 1:
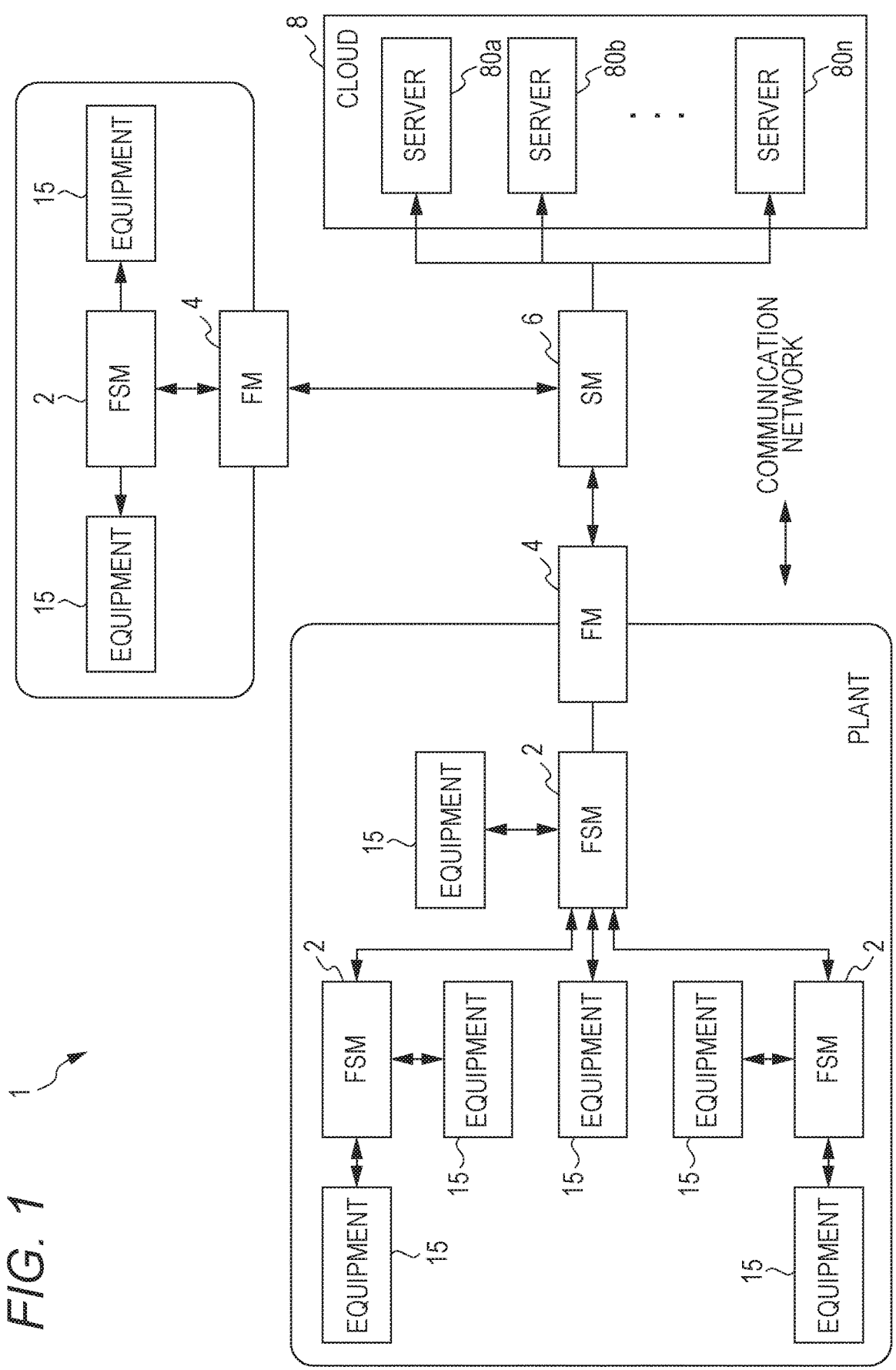
FIG. 1 is a diagram for explaining an entire configuration of an equipment management system according to the present invention.

An equipment management system 1 according to the present invention realizes the three basic functions "openability/closability", "flexibility", and "quantitation property" in On-Demand Manufacturing in three layers of a service manager (SM) 6, a field manager (FM) 4, and a flexible system manager (FSM: adaptive system control unit) 2 as illustrated in FIG. 1. The SM 6, the FM 4, and the FSM 2 cooperatively perform a series of managements including detecting information, analyzing data, controlling, and the like between the layers.

The SM 6 has a function of managing openability/closability and quantitation property of information in the entire equipment management system 1. The SM 6 monitors a service level on the basis of the contract with the client. The SM 6 performs various services such as providing services, guaranteeing quality based on the contract with the client, protecting or measuring information, and accounting. Further, the SM 6 can access the information accumulated in a cloud 8. The SM 6 processes the information acquired from the cloud 8 into information to be provided to other SM 6 on the basis of the contract with the client, and transmits the processed information. The SM 6 manages one or more FMs 4 under control of the SM 6, and determines a communication policy, a communication frequency, and the like including a communication system of wireless communication by the FMs 4. Furthermore, the SM 6 controls the FMs 4 under its control, collects information required for monitoring service quality, and monitors service quality in order to make wireless communication according to an appropriate communication policy based on the situation.

The FMs 4 are managed by the SM 6 described above, respectively. Additionally, the FMs 4 may be managed by two or more SMs 6. A FM 4 is basically assigned to each plant in a scene, and has a function of realizing openability/closability and quantitation property of the plant under control of the FM 4. The FM 4 operates in the plant under control of the FM 4, determines a control schedule, and classifies internal information and external information according to the communication policy or the like determined by the SM 6. Further, the FM 4 manages one or more FSMs 2 installed in the plant in the scene under control of the FM 4. The FM 4 generates, in cooperation with the SM6, a local service policy in which the FSM 2 controls the equipment in consideration of service quality, and a local communication policy for controlling the communication conditions such as communication frequency, communication path, and communication parameters for collecting and sharing information and controlling equipment and power supply. The FM 4 instructs the FSM 2 to rewrite the generated local service policy and local communication policy as needed. The FM 4 collects the information required to generate the local service policy and the local communication policy in units of plant, and monitors operation statuses, communication quality, and the like of the equipment in the plant.

The FSM 2 is assigned to one or more pieces of equipment 15 installed in the plant, and manages them. The FSM 2 controls the equipment 15 on the basis of the local service policy designated by the FM 4. The FSM 2 determines a communication system for controlling the equipment 15 on the basis of the local communication policy designated by the FM 4. The FMS 2 collects the information required to generate the local service policy and the local communication policy for each piece of equipment 15, and performs various control on the equipment 15 on the basis of the collected information.

The equipment 15 includes manufacture equipment installed on a production line, inspection equipment for inspecting the manufacture equipment, an automatic guided vehicle traveling in the plant, and any other equipment used in the plant. The equipment 15 is managed by the FSM 2 via wireless communication with the FSM 2.

A detailed configuration of each layer in the equipment management system 1 according to the present invention will be described below.

Figure 2:
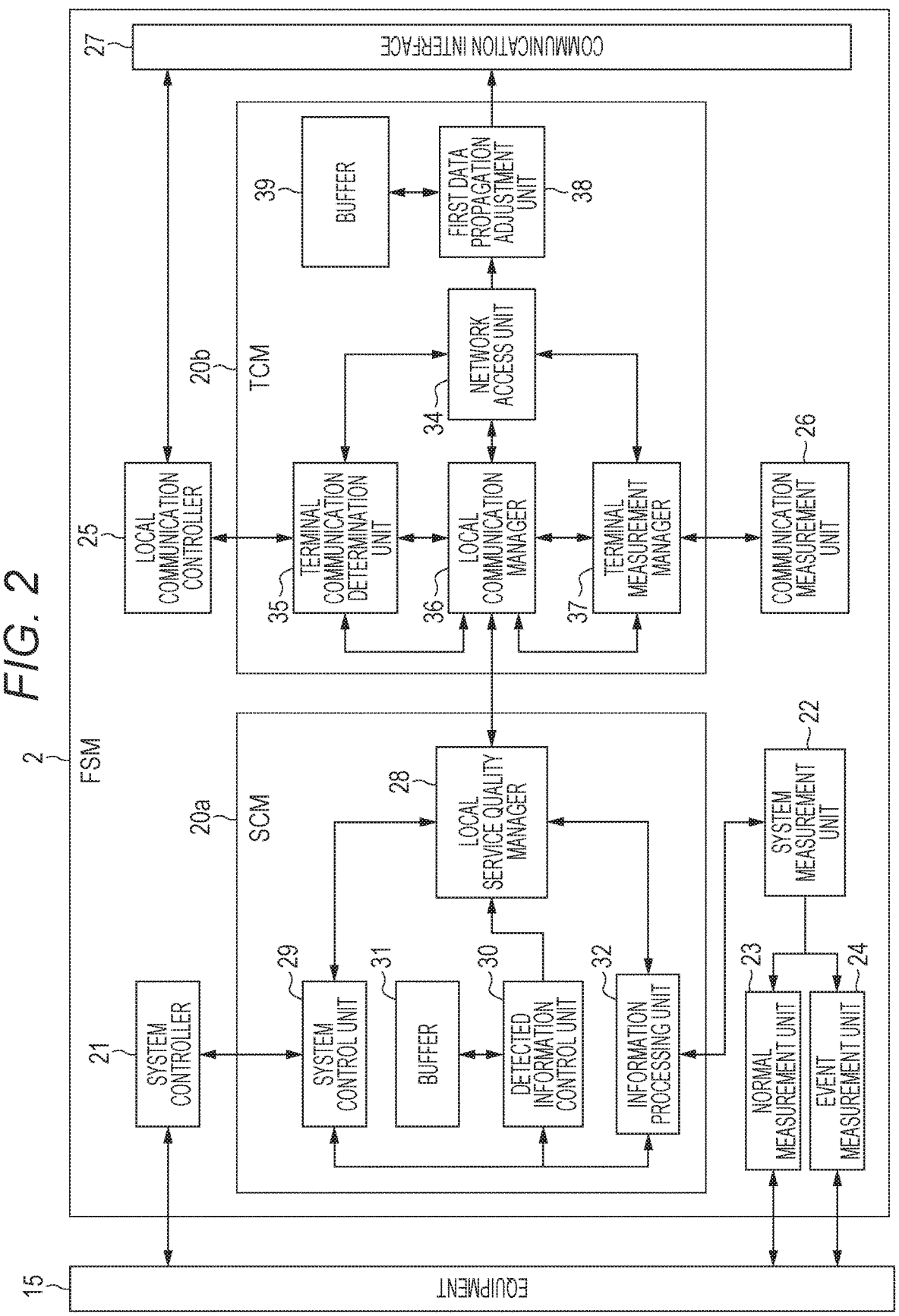
FIG. 2 is a diagram illustrating a block configuration of a FSM in the equipment management system according to the present invention.

FIG. 2 illustrates a block configuration of the FSM 2. The FSM 2 is generally configured of a system control manager (SCM) 20*a* and a terminal communication manager (TCM) 20*b*. The FSM 2 includes a system controller 21 and a system measurement unit 22 connected to the SCM 20*a*, a normal measurement unit 23 and an event measurement unit 24 connected to the system measurement unit 22, and a local communication controller 25 and a communication measurement unit 26 connected to the TCM 20*b* in addition to the SCM 20*a* and the TCM 20*b*. The TCM 20*b* is further connected with a communication interface 27.

A local service quality manager 28 at the center of the SCM 20*a* is connected with a system control unit 29, a detected information control unit 30, and an information processing unit 32. The detected information control unit 30 is further connected with a buffer 31.

A network access unit 34 at the center of the TCM 20*b* is connected with a terminal communication determination unit 35, a local communication manager 36, a terminal measurement manager 37, and a first data propagation adjustment unit 38. The first data propagation adjustment unit 38 is further connected with a buffer 39.

The system controller 21 is a wireless communication interface for making wireless communication with the equipment 15. The system controller 21 transmits a control signal for controlling the equipment 15 to the equipment 15 via wireless communication under control of the system control unit 29, and the equipment 15 is subjected to various control on the basis of the control signal. The control signals transmitted from the system controller 21 are for opening/closing a physical switch in order to supply the equipment 15 with power, for controlling all the operations of the equipment 15, for stopping traveling of the equipment 15 in case of emergency, for stopping an operation, and the like.

The normal measurement unit 23 is a device for detecting various items of information from the equipment 15 via wireless communication under control of the system measurement unit 22. The normal measurement unit 23 periodically detects various items of information from the equipment 15 in normal times in which an event does not particularly occur. The information to be detected includes information on the status of the equipment 15 such as torque value and torque waveform, image information of the equipment 15, information on noises of the motor configuring the equipment 15, and the number of vibrations or consumed power of the equipment 15, and all the information caused from the equipment 15 such as signal intensity or delay time of wireless signal transmitted from the equipment 15. The normal measurement unit 23 outputs the detected information to the system measurement unit 22.

Similarly to the normal measurement unit 23, the event measurement unit 24 is a device for detecting various items of information from the equipment 15 via wireless communication under control of the system measurement unit 22. However, only when any different event from those in normal times occurs, for example, when an abnormality is detected in the equipment 15 or the equipment 15 stops, the event measurement unit 24 measures various items of information from the equipment 15. The information to be measured by the event measurement unit 24 is similar to that by the normal measurement unit 23, but the measurement conditions may be different from those of the normal measurement unit 23. For example, when an abnormality occurs in the equipment 15, the measurement mode may be changed, for example, the number of vibrations of the motor, which is detected by the normal measurement unit 23 at intervals of 10 minutes in normal times, is measured by the event measurement unit 24 at intervals of one minute.

The system measurement unit 22 controls the normal measurement unit 23 and the event measurement unit 24, both of which are connected thereto, in response to the instructions from the SCM 20*a*. The system measurement unit 22 collects the information to be measured by the normal measurement unit 23 and the event measurement unit 24, and provides it to the information processing unit 32 in the SCM 20*a*. The system measurement unit 22 monitors the occurrences of failures or various events in the equipment 15 through collection of the information, and notifies the SCM 20*a* of the result.

The local service quality manager 28 in the SCM 20*a* issues an instruction to control the system control unit 29 and the information processing unit 32 on the basis of the local service policy notification of which is provided from the FM 4. The local service quality manager 28 acquires various items of information notification of which is provided from the system control unit 29 and the information processing unit 32, and notifies the local communication manager 36 in the TCM 20*b* of the information or controls the system control unit 29 and the information processing unit 32 on the basis of the acquired information.

The system control unit 29 controls the system controller 21 in response to an instruction of the local service quality manager 28. The system control unit 29 determines how to actually control the equipment 15 and notifies the system controller 21 of the specific control policy in order to realize the local service policy notification of which is provided from the local service quality manager 28. Thereby, the system controller 21 can specifically control the equipment 15.

The information processing unit 32 receives all the information collected by the system measurement unit 22. The information processing unit 32 transmits the received information to the detected information control unit 30. The information processing unit 32 may temporarily store all or part of the information transmitted from the system measurement unit 22 as needed. The information processing unit 32 transmits the information measurement policies of the normal measurement unit 23 and the event measurement unit 24 to the system measurement unit 22 in response to an instruction of the local service quality manager 28. Further, the information processing unit 32 is directly connected to the system control unit 29, and can control the system measurement unit 22 to make various measurements in association with the control of the equipment 15 by the system controller 21.

Figure 3:
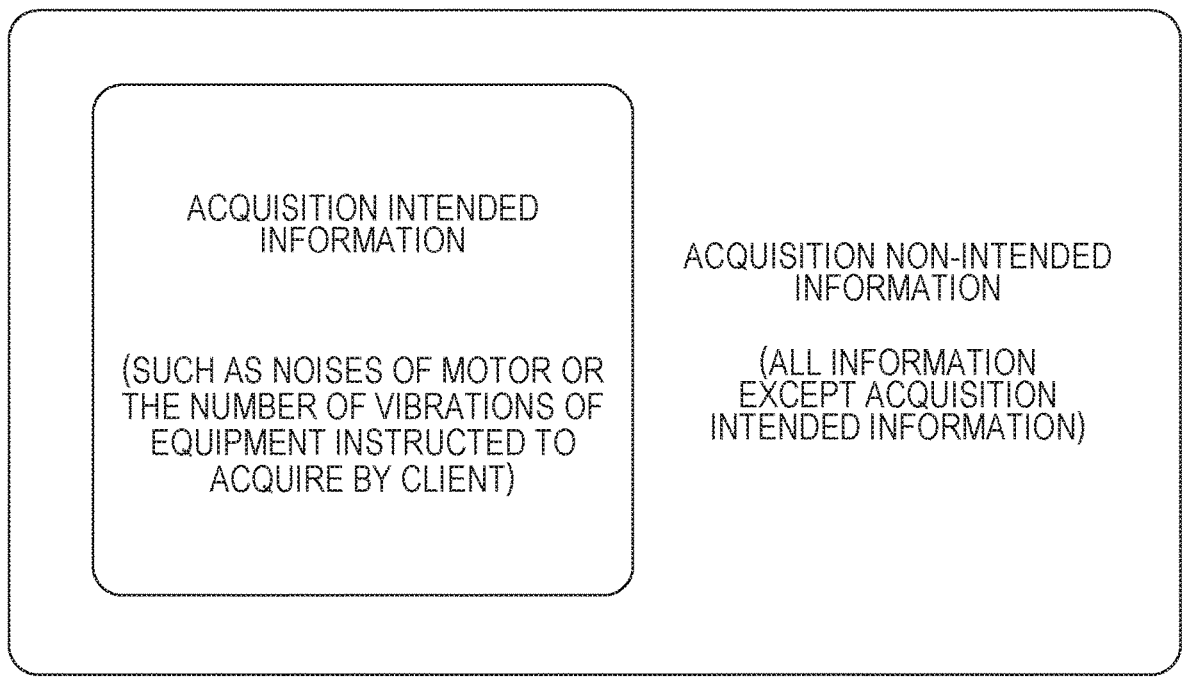
FIG. 3 is a diagram for explaining concepts of acquisition intended information and acquisition non-intended information.

The detected information control unit 30 determines whether the information detected from the equipment 15, which is transmitted via the information processing unit 32, is previously intended to be acquired. As illustrated in FIG. 3, the information detected from the equipment 15 is largely classified into information to be acquired (which will be denoted as acquisition intended information below) and information not to be acquired (which will be denoted as acquisition non-intended information below). The acquisition intended information is information on noises of the motor and the number of vibrations of the equipment, which the client running the plant wants to acquire, and is generally predefined on the basis of the client's intention. To the contrary, the acquisition non-intended information is all the information except the acquisition intended information. When determining that the detected information is the acquisition intended information, the detected information control unit 30 transmits the information to the local service quality manager 28. To the contrary, when determining that the detected information is the acquisition non-intended information, the detected information control unit 30 does not transmit the information to the local service quality manager 28 thereby to protect the information without any leak to the outside. The detected information control unit 30 may temporarily store the acquisition intended information to be transmitted to the local service quality manager 28 in the buffer 31. Thereby, a timing when information is sent to the detected information control unit 30 and a timing when the acquisition intended information is transmitted to the local service quality manager 28 can be controlled.

The local communication controller 25 controls and makes communication with a communication device of the equipment 15 in response to an instruction of the TCM 20*b*.

The communication measurement unit 26 collects communication control information required for communication control, and provides the information to the terminal measurement manager 37 in the TCM 20*b*. Notification of the policy for collecting communication control information by the communication measurement unit 26 is provided from the terminal measurement manager 37.

The TCM 20*b* controls communication between the FSM 2 and the outside on the basis of the local communication policy provided from the FM 4. The terminal measurement manager 37 in the TCM 20*b* transmits the communication control information transmitted from the communication measurement unit 26 to the local communication manager 36 and the network access unit 34. Further, the terminal measurement manager 37 controls the communication measurement unit 26 to collect the communication control information under control of the local communication manager 36 and the network access unit 34.

The local communication manager 36 in the TOM 20*b* notifies the terminal communication determination unit 35 of various communication conditions or the policy according to the local communication policy. The local communication manager 36 may control the terminal communication determination unit 35 on the basis of the communication control information notification of which is provided from the terminal measurement manager 37 as needed. The local communication manager 36 transmits the acquisition intended information transmitted from the detected information control unit 30 in the SCM 20*a* via the local service quality manager 28 to the network access unit 34.

The terminal communication determination unit 35 controls communication made by the local communication controller 25 under control of the local communication manager 36 and the network access unit 34.

The network access unit 34 controls actual communication between the FSM 2 and the outside together with the local communication manager 36. The network access unit 34 selects a network in which the data is actually transmitted. The network access unit 34 transmits the acquisition intended information transmitted from the local communication manager 36 to the first data propagation adjustment unit 38.

The first data propagation adjustment unit 38 is a device for adjusting a propagation path when transmitting the data including the acquisition intended information transmitted from the network access unit 34 from the FSM 2 to the outside. The propagation path may be adjusted in cooperation with the network access unit 34 as needed. The first data propagation adjustment unit 38 controls such that the data including the acquisition intended information is propagated in an appropriate communication path in cooperation with the data propagation adjustment unit in the FM 4 described below without any leak to the outside. The first data propagation adjustment unit 38 may of course temporarily store the data to be transmitted in the buffer 39.

The communication interface 27 is configured of various devices required for making wireless communication between the FSM 2 and other FSM 2 or the FM 4.

Figure 4:
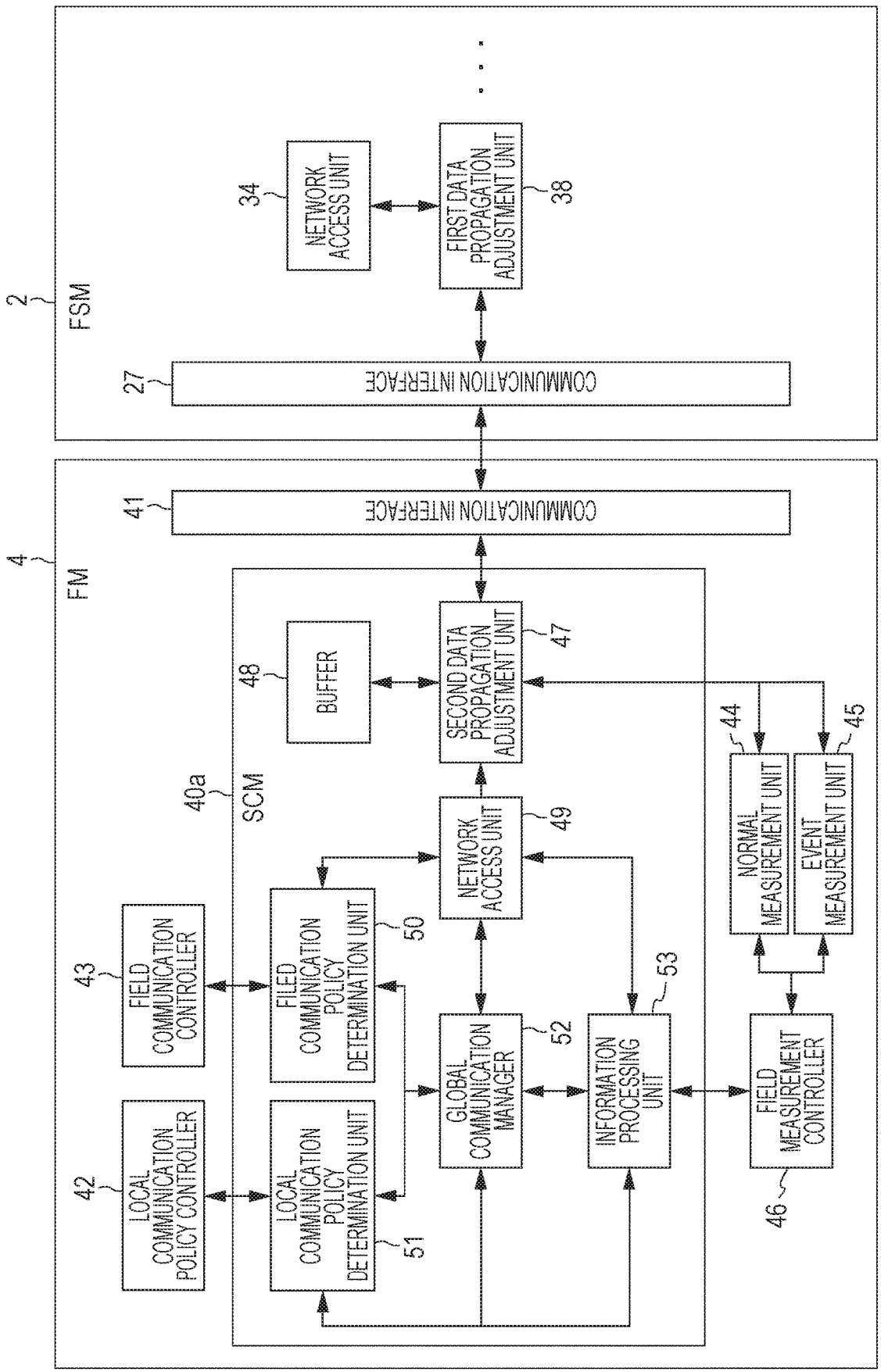
FIG. 4 is a diagram illustrating a block configuration of a FM in the equipment management system according to the present invention.

FIG. 4 illustrates a block configuration of the FM 4. The FM 4 is generally configured of a system control manager (SCM) 40*a*. The FM 4 includes a communication interface 41, a local communication policy controller 42, a field communication controller 43, and a field measurement controller 46, which are connected to the SCM 40*a*, and further includes a normal measurement unit 44 and an event measurement unit 45 which are connected to the field measurement controller 46.

A global communication manager 52 at the center of the SCM 40*a* is connected with a network access unit 49, a field communication policy determination unit 50, a local communication policy determination unit 51, and an information processing unit 53. The network access unit 49 is further connected with a second data propagation adjustment unit 47, and the second data propagation adjustment unit 47 is further connected with a buffer 48.

The communication interface 41 is configured of various devices required for making wireless communication between the FM 4 and other FM 4, the FSM 2, or the SM 4.

The local communication policy controller 42 provides the FSM 2 with the local communication policy, and instructs the FSM 2 to rewrite it. The local communication policy controller 42 controls a communication frequency or communication path for collecting and sharing information detected by the FSM 2, and controlling the equipment 15 or the power supply. The local communication policy controller 42 performs various operations in order to realize the local communication policy provided by the local communication policy determination unit 51.

The field communication controller 43 controls a communication system, a communication frequency, and the like for communication with the FSM 2 and the SM 4. The field communication controller 43 performs various operations under control of the field communication policy determination unit 50.

The normal measurement unit 44 is a device for detecting various items of information via wireless communication under control of the field measurement controller 46. While the normal measurement unit 23 detects information in units of a piece of equipment 15, the normal measurement unit 44 detects various items of information in units of a plant. The normal measurement unit 44 periodically detects various items of information from the equipment plant in normal times when an even does not, particularly occur. The normal measurement unit 44 detects the information such as operation situation of the entire plant, and additionally measures a state of rotation of the motor in the plant per certain period of time, measures humidity, temperature, and the like in the plant every predetermined time, or measures a consumption situation and the like of each consumable in the plant every predetermined time. The normal measurement unit 44 outputs the detected information to the field measurement controller 46.

Similarly to the normal measurement unit 44, the event measurement unit 45 is a device for detecting various items of information from the plant via wireless communication under control of the field measurement controller 46. However, the event measurement unit 45 measures various items of information only when any different event from those in normal times is caused, for example, when any abnormality is detected in the plant or when the plant stops. The information to be measured by the event measurement unit 45 is similar to that by the normal measurement unit 44.

The field measurement controller 46 controls the normal measurement unit 44 and the event measurement unit 45, which are connected thereto, in response to the instructions from the SCM 40*a*. The field measurement controller 46 collects the information to be measured by the normal measurement unit 44 and the event measurement unit 45, and provides the information to the information processing unit 53 in the SCM 40*a*. The field measurement controller 46 monitors the situations of the entire plant or the occurrences of various events through the information collection, and notifies the SCM 40*a* of the result.

The second data propagation adjustment unit 47 receives various items of data via the communication interface 41, transmits the data to the network access unit 49 as needed, and transmits the data transmitted from the network access unit 49 to the outside via the communication interface 41. The second data propagation adjustment unit 47 is a device for adjusting a propagation path when the data including the acquisition intended information is transmitted from the FSM 2 and is then transmitted to the outside. The second data propagation adjustment unit 47 controls propagating the data including the acquisition intended information in an appropriate communication path in cooperation with the first data propagation adjustment unit 38 in the FSM 2 without any leak to the outside. The second data propagation adjustment unit 47 may of course temporarily store the data including the acquisition intended information to be transmitted in the buffer 48.

Additionally, the second data propagation adjustment unit 47 may be connected to the normal measurement unit 44 and the event measurement unit 45. Thereby, a propagation path for the data including the acquisition intended information can be controlled to be adjusted on the basis of the information measured by the normal measurement unit 44 and the event measurement unit 45. At this time, the second data propagation adjustment unit 47 may perform the operations in cooperation with the network access unit 49. Further, a method for measuring various items of information by the normal measurement unit 44 and the event measurement unit 45 may be determined on the basis of the acquisition intended information acquired by the second data propagation adjustment unit 47.

The network access unit 49 controls actual communication between the FM 4 and the outside together with the global communication manager 52. The network access unit 49 selects a network in which the data is actually transmitted.

The global communication manager 52 creates a local communication policy and a local service policy in its managing FSM 2 per FSM 2. The global communication manager 52 acquires the information required to generate the local service policy and the local communication policy from the field measurement controller 46 depending on the situation. When the field measurement controller 46 can monitor the operation statuses of the equipment in the plant, the communication quality, and the like, the local service policy and the local communication policy, on which the information is reflected, can be generated. Further, the global communication manager 52 may reflect the service policy notification of which is provided from the SM 6 on the local service policy and the local communication policy. The global communication manager 52 transmits the created local communication policy to the local communication policy determination unit 51.

The local communication policy determination unit 51 determines a suitable local communication policy for meeting the local service policy. The local communication policy determined by the local communication policy determination unit 51 is provided to the local communication policy controller 42.

The field communication policy determination unit 50 determines a communication policy for communication with the FSM 2 and the SM 4. Further, the field communication policy determination unit 50 notifies the field communication controller 43 of the generated communication policy.

The information processing unit 53 receives all the information collected by the field measurement controller 46. The information processing unit 53 transmits the received information to the global communication manager 52 and the like. The information processing unit 53 may temporarily store all or part of the information transmitted from the field measurement controller 46 as needed. The information processing unit 53 transmits the information measurement policies of the normal measurement unit 44 and the event measurement unit 45 to the field measurement controller 46 in response to an instruction from the global communication manager 52. Further, the information processing unit 53 is directly connected to the local communication policy determination unit 51, and may reflect the collected information on the determination of a local communication policy by the local communication policy determination unit 51.

Figure 5:
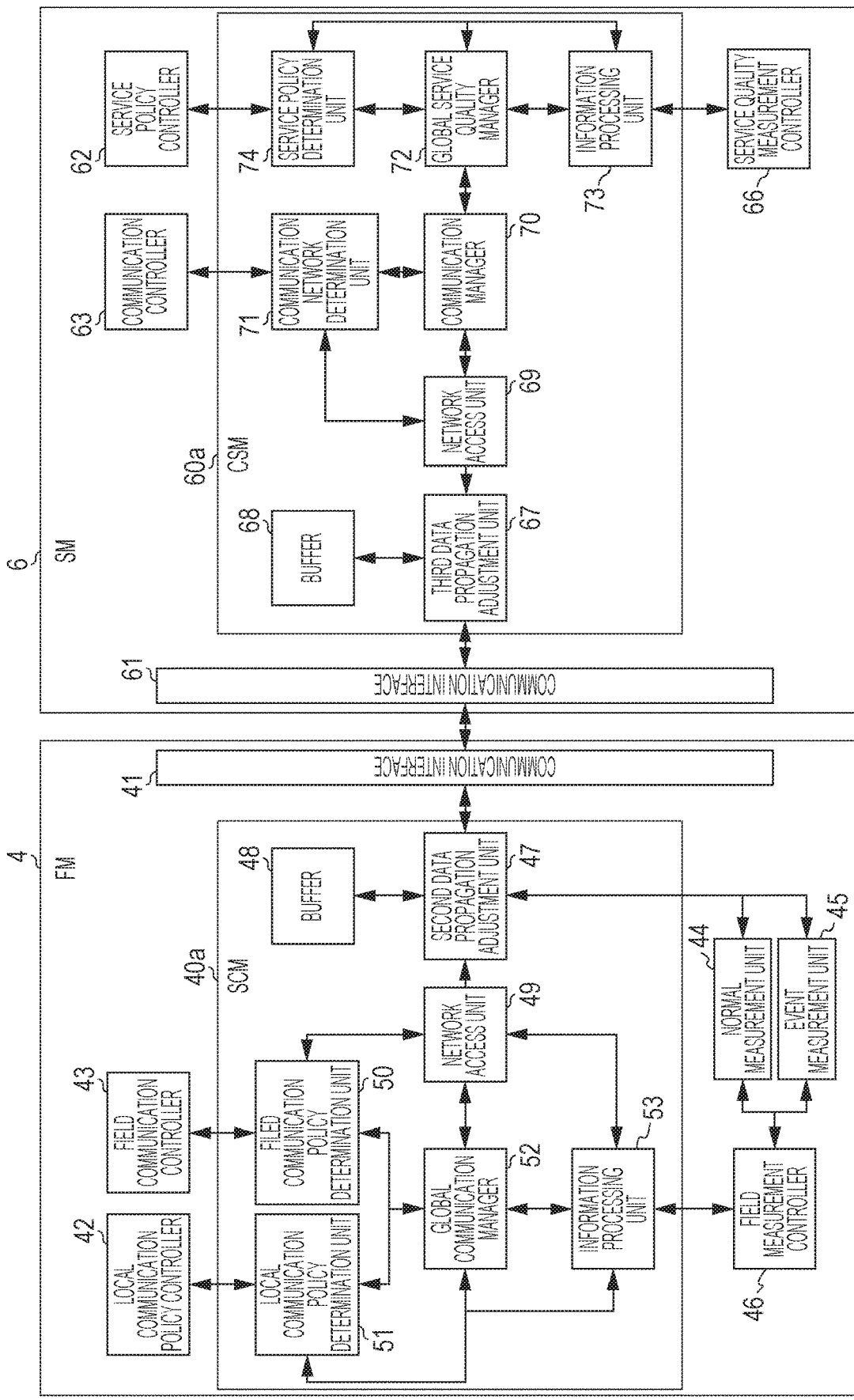
FIG. 5 is a diagram illustrating the block configurations of a FM and a SM wirelessly communicating therewith.

FIG. 5 illustrates the block configurations of the FM 4 and the SM 6 wirelessly communicating therewith. The SM 6 is generally configured of a cloud service manager (CSM) 60*a*. The SM 6 includes a communication interface 61, a service policy controller 62, a communication controller 63, and a service quality measurement controller 66, which are connected to the CSM 60*a*.

A global service quality manager 72 at the center of the CSM 60*a* is connected with a service policy determination unit 74, a communication manager 70, and an information processing unit 73. The communication manager 70 is connected with a communication network determination unit 71 and a network access unit 69. The network access unit 69 is further connected with a third data propagation adjustment unit 67, and the third data propagation adjustment unit 67 is connected with a buffer 68.

The communication interface 61 is configured of various devices required to make wireless communication between the SM 6 and the FM 4.

The service policy controller 62 provides the FSM 2 with the service policy, and instructs the FSM 2 to rewrite it. The service policy controller 62 performs various operations in order to realize the service policy provided by the service policy determination unit 74.

The communication controller 63 sets a communication system in response to an instruction of the FM 4, and makes communication. The communication controller 63 performs various operations under control of the communication network determination unit 71.

The service quality measurement controller 66 measures a status of service quality provided by the equipment management system 1, and provides it to the CSM 60*a*. The service quality measurement controller 66 detects various items of information as a unit of the entire system. The information detected by the service quality measurement controller 66 is error rate, rate of loss, reception signal intensity, delay amount of reception signal, interval to exchange data, and the like of data exchanged in an in-service line. The service quality measurement controller 66 outputs the detected information to the information processing unit 73.

The third data propagation adjustment unit 67 receives various items of data via the communication interface 61, transmits the data to the network access unit 69 as needed, and transmits the data transmitted from the network access unit 69 to the outside via the communication interface 61. The third data propagation adjustment unit 67 is a device for adjusting a propagation path when the data including the acquisition intended information is transmitted from the SM 6. The third data propagation adjustment unit 67 controls propagating the data including the acquisition intended information in an appropriate communication path in cooperation with the second data propagation adjustment unit 47 in the FM 4 without any leak to the outside. The third data propagation adjustment unit 67 may perform the operations in cooperation with the network access unit 69. The third data propagation adjustment unit 67 may of course temporarily store the data including the acquisition intended information to be transmitted in the buffer 68.

The network access unit 69 controls actual communication between the SM 6 and the outside together with the communication manager 70. The network access unit 69 selects a network in which the data is actually transmitted.

The communication manager 70 monitors a communication status of the FM 4 under control of the communication manager 70. Further, the communication manager determines a service policy (including communication means, communication frequency, and the like) of the entire system.

The communication network determination unit 71 determines a communication path, a communication system in the path, and the like.

The information processing unit 73 receives the information on the status of service quality collected by the service quality measurement controller 66. The information processing unit 73 transmits the received information to the global service quality manager 72. The information processing unit 73 may temporarily store all or part of the information transmitted from the service quality measurement controller 66 as needed. The information processing unit 73 can change the policy for measuring the information on service quality for the service quality measurement controller 66 as needed in response to an instruction from the global service quality manager 72.

The global service quality manager 72 instructs the service policy determination unit 74 to create an optimum service policy on the basis of the status of the FM 4 under control of the global service quality manager 72. At this time, the global service quality manager 72 may give an instruction to create the service policy on the basis of the information on the status of service quality transmitted via the information processing unit 73. Further, the global service quality manager 72 may give an instruction to create a service policy on the basis of the acquisition intended information transmitted via the third data propagation adjustment unit 67 and the network access unit 69. The global service quality manager 72 transmits the service policy created in the service policy determination unit 74 to the FM 4 via the communication manager 70, the network access unit 69, and the third data propagation adjustment unit 67.

The service policy determination unit 74 creates an optimum service policy in response to an instruction of the global service quality manager 72. The service policy determination unit 74 notifies the global service quality manager 72 of the created service policy.

Figure 6:
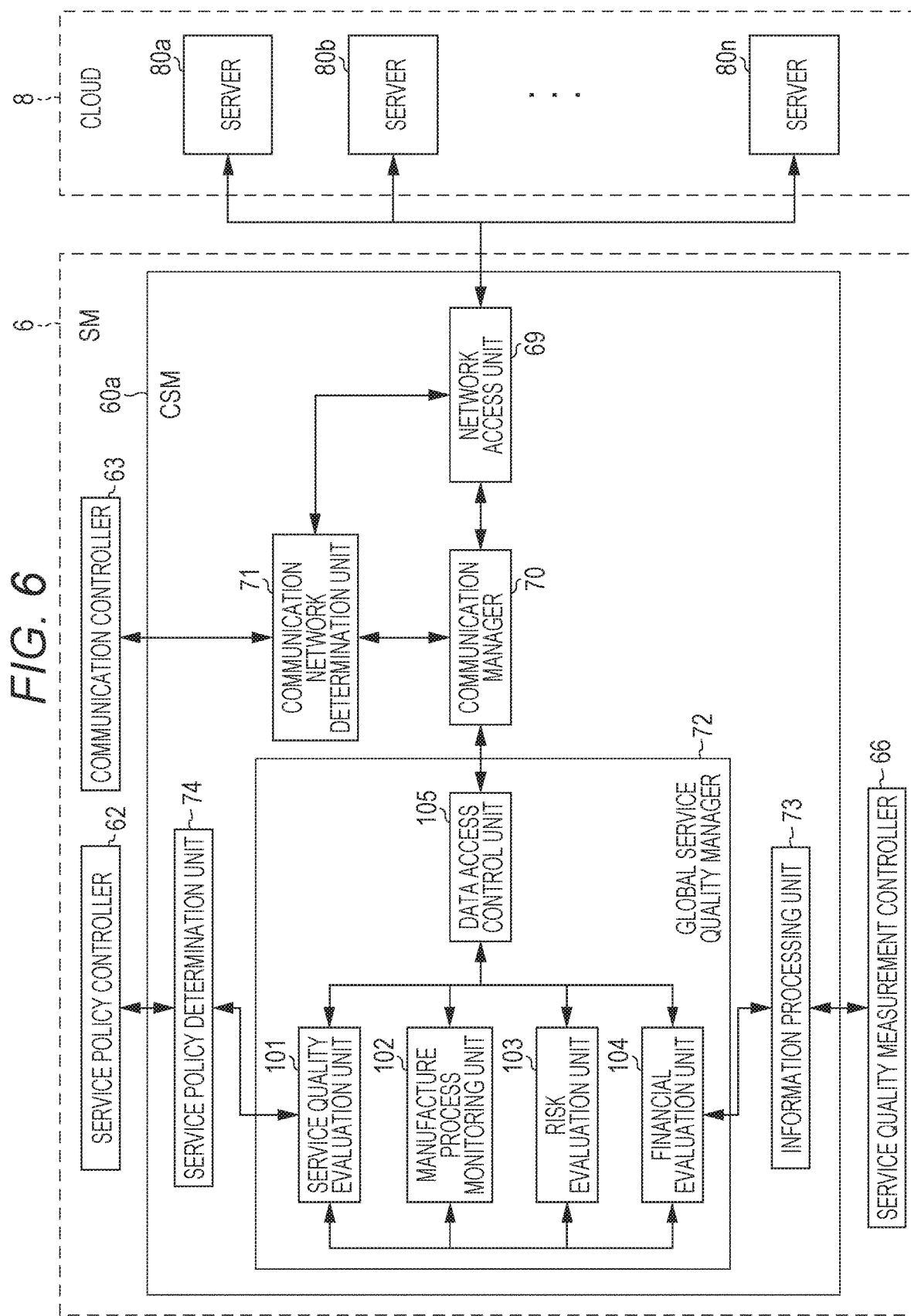
FIG. 6 is a diagram illustrating the block configurations of a SM and a Cloud wirelessly communicating therewith.

FIG. 6 illustrates the block configurations of the SM 6 and the cloud 8 wirelessly communicating therewith. The same components and members are denoted with the same reference numerals in the above description of the SM 6, and thus the description thereof will be omitted below.

Each of servers 80*a*, 80*b*, 80*n* in the cloud 8 stores the information on enterprise resource planning (ERP), production management, manufacture equipment control, power supply information, and weather information.

The SM 6 accesses the cloud 8 via the network access unit 69.

The global service quality manager 72 in the SM 6 has a service quality evaluation unit 101, a manufacture process monitoring unit 102, a risk evaluation unit 103, a financial evaluation unit 104, and a data access control unit 105 connected to them.

The service quality evaluation unit 101 acquires and evaluates the information on a status of service quality sent via the information processing unit 73. Specifically, the service quality evaluation unit 101 evaluates whether error rate, rate of loss, reception signal intensity, delay amount of arrival, dispersion of intervals to exchange data, and the like of data exchanged in an in-service line meet the level of an actually-provided service.

The manufacture process monitoring unit 102 analyzes various items of data thereby to grasp an actual manufacture situation in the plant.

The risk evaluation unit 103 analyzes various items of data thereby to analyze and predict the magnitude, frequency, and the like of a risk in the manufacture scene.

The financial evaluation unit 104 analyzes various items of data thereby to evaluate the financial status of the plant.

Further, the data access control unit 105 determines which one of the servers 80*a*, 80*b*, . . . 80*n* in the cloud 8 to access in order to acquire appropriate information for the service quality evaluation unit 101, the manufacture process monitoring unit 102, the risk evaluation unit 103, and the financial evaluation unit 104 to make various evaluations. The data access control unit 105 determines the policy, and then accesses the cloud 8 via the network access unit 69 thereby to acquire necessary information.

The operations of the thus-configured equipment management system 1 will be described below.

The SM 6 creates a service policy for performing various services such as guaranteeing quality based on the contract with the client, protecting or measuring information, and accounting in the service policy determination unit 74. The service policy determination unit 74 notifies the FM 4 of the created service policy via the service policy controller 62.

Figure 7:
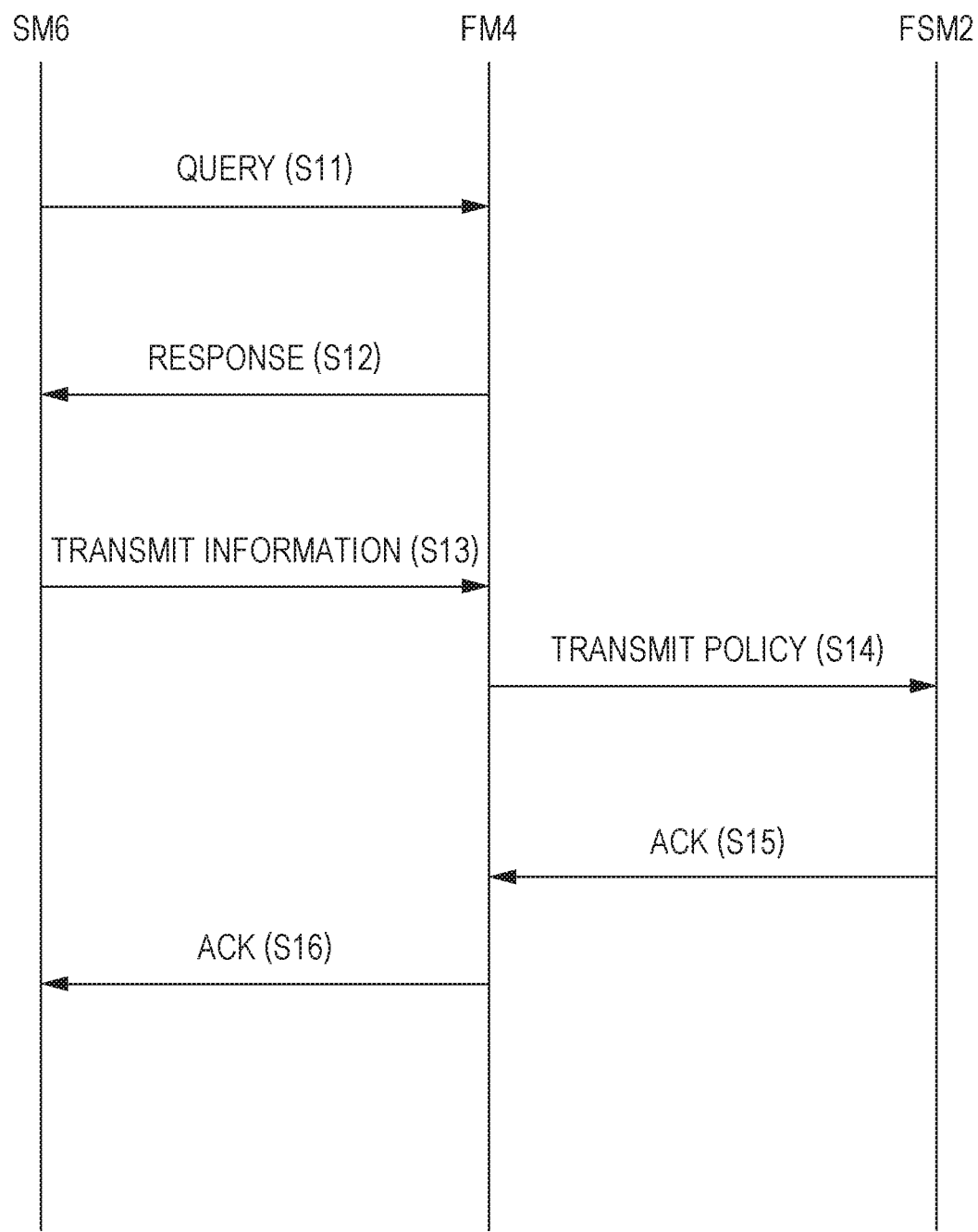
FIG. 7 is a diagram illustrating an outline of a communication sequence among the SM, the FM, and the FSM.

The FM 4 receives the service policy sent from the SM 6, and controls the FSM 2 under control of the FM 4 on the basis of the instructed contents. FIG. 7 illustrates an outline of a communication sequence among the SM 6, the FM 4, and the FSM 2. The SM 6 transmits a query to a selected FM 4 (step S11). The query is directed to request to determine whether the created service policy is executable according to the current situation. When determining that the local service policy is executable according to the current situation, the FM 4 transmits a response indicating acceptance of the query to the SM 6 (step S12). On the other hand, when determining that the service policy is not executable according to the current situation, the FM 4 does not transmit any response to the SM 6.

When receiving the response in step S12, the SM 6 transmits the schedule of various control and the information on required communication resources to the FM 4 (step S13). The FM 4 refers to the information notification of which is provided in step S13 and the service policy notified from the SM 6 as needed so that the global communication manager 52 creates a local communication policy and a local service policy of the FSM 2 under control of the FM 4 per FSM 2. At this time, the global communication manager 52 may acquire the information required to generate the local service policy and the local communication policy from the operation information of the plant and the like detected by the field measurement controller 46 as needed. Further, the FM 4 may refer to all the data transmitted from the FSM 2 when creating the local service policy and the local communication policy.

The FM 4 transmits the newly-created local communication policy and local service policy to the FSM 2 (step S14).

When finishing rewriting to the received local communication policy and local service policy, the FSM 2 transmits ACK as a response to the FM 4 (step S15). When receiving the ACK, the FM 4 transmits ACK indicating completion to the SM 6 (step S16). The FSM 2 controls its managing equipment 15 on the basis of the rewritten local communication policy and local service policy. The FSM 2 controls communication on the basis of the local communication policy via the TCM 20*b*, and controls the service on the basis of the local service policy via the SCM 20*a*.

Table 1 indicates an exemplary local communication policy created by the SM 6. The maximum number of times of packet transmission, the allowable packet loss (%), the minimum allowable reception signal intensity (dBm), and the reception possibility (%, dBm) are defined per service type in the local communication policy. For example, the conditions of communication for providing a service are that in the case of service type 1, 90% or more of the packets can be received at −65 dBm or more when the maximum number of times of packet transmission is only one and the allowable packet loss is 10% or less. Further, in the case of service type 2, the maximum number of times of packet transmission may be two and the allowable packet loss may be 20% or less, while the minimum allowable reception signal intensity of −85 dBm is required.

TABLE 1

| Service type | Maximum number of times of packet transmission | Allowable packet loss (%) | Minimum allowable reception signal intensity (dBm) | Reception possibility (%, dBm) |
| --- | --- | --- | --- | --- |
| 1 | 1 | 10 | — | (90, −65) |
| 2 | 2 | 20 | −85 | — |
| 3 | 1 | 5 | — | — |
| 4 | 3 | 0.1 | — | (50, −65) |
| 5 | 4 | 0.1 | — | (80, −70) |
| ... | ... | ... | ... | ... |

The FM 4 creates the candidates for setting the communication conditions of the equipment 15 and the FSM 2 on the basis of the exemplary local communication policy in Table 1, the communication control information measured by the communication measurement unit 26, for example, and the like. Then, the FM 4 finally sets the specific communication conditions as indicated in Table 2, and realizes communication with the equipment 15 under the communication conditions.

TABLE 2

| Service type | Selected communication frequency | Maximum number of times of packet transmission | Data transmission rate (Mdps) |
| --- | --- | --- | --- |
| 1 | 2.4 | 1 | 11 |
| 2 | 2.4 | 2 | 11 |
| 3 | 5 | 1 | 12 |
| 4 | 2.4 | 3 | 36 |
| 5 | 5 | 4 | 6 |
| ... | ... | ... | ... |

The equipment management system 1 according to the present invention cooperatively performs a series of managements such as detecting information, analyzing data, and controlling in the three layers of the SM 6, the FM 4, and the FSM 2 according to the local communication policy and the local service policy, thereby realizing the function of On-Demand Manufacturing.

Additionally, when the acquisition intended information is defined on the basis of the client intention, the SM 2 includes the definition in the service policy, and manages the FM 4 and the FSM 2. The acquisition intended information is set under control of the global service quality manager in the SM 6, and the set acquisition intended information is included in the service policy to be provided to the FM 4 and the FSM 2 as notification. When notification of the service policy is actually provided from the FM 4 to the FSM 2, the local service quality manager 28 instructs the detected information control unit 30 to determine the acquisition intended information. The detected information control unit 30 determines whether the information detected by the equipment 15 is the acquisition intended information or the acquisition non-intended information in response to the instruction. Consequently, when the detected information control unit 30 determines that the detected information is the acquisition intended information, the determination indicates that the information requested by the client is detected. That is, when the detected information control unit 30 determines that the detected information is the acquisition intended information, the determination indicates that it is confirmed that the information which the client does not want to acquire is not acquired. In such a case, the detected information control unit 30 transmits the acquisition intended information to the local service quality manager 28, and the local service quality manager 28 transmits the acquisition intended information to the TCM 20*b*.

On the other hand, when the detected information control unit 30 determines that the detected information is the acquisition non-intended information, the determination indicates that the information other than the information requested by the client is detected. In other words, the determination indicates that the information which the client does not want to acquire is acquired. The acquisition of the acquisition non-intended information can lead to contract violation with the client, and thus the equipment management system 1 as an operating side really wants to avoid the situation. In such a case, the detected information control unit 30 does not transmit the acquisition non-intended information to the local service quality manager 28. Consequently, the detected acquisition non-intended information can be of course prevented from being leaked to the outside, and the detected information detected information control unit 30 in the system may erase the acquisition non-intended information.

With the control by the detected information control unit 30 as described above, it is possible to prevent the acquisition non-intended information which is not desired to detect from being transferred to the outside, and it is possible to transfer only the acquisition intended information which is desired to detect to the outside.

With the control by the detected information control unit 30 as described above, it is guaranteed that only the acquisition intended information is acquired. Additionally, the operations of the detected information control unit 30 are not limited to the above ones, and may be embodied in any method capable of guaranteeing that only the acquisition intended information is acquired.

Further, the data including the detected acquisition intended information is sent to the first data propagation adjustment unit 38 via the local service quality manager 28, the local communication manager 36, and the network access unit 34. The first data propagation adjustment unit 38 adjusts a propagation path for transmitting the data including the acquisition intended information from the FSM 2 to the outside. The propagation path is adjusted in cooperation with the second data propagation adjustment unit 47 in the FM 4 and the third data propagation adjustment unit 67 in the SM 6. For example, when the route horizontally extending toward the SM 6 illustrated in FIG. 1 is accessible only by a company and its associated company, a propagation path for the data including the acquisition intended information is controlled to be the horizontal route. Thereby, it is possible to prevent the acquisition intended information from being deviated from the horizontal route, and even if the acquisition intended information is accessed via the FM 4 or the SM 6, the acquisition intended information can be prevented from being leaked to the outside since the information in the horizontal route is within the company or the like. Thereby, according to the present invention, it is possible to take the system configuration capable of guaranteeing that the data including the detected acquisition intended information flows only in a specific path on the client.

Figure 8:
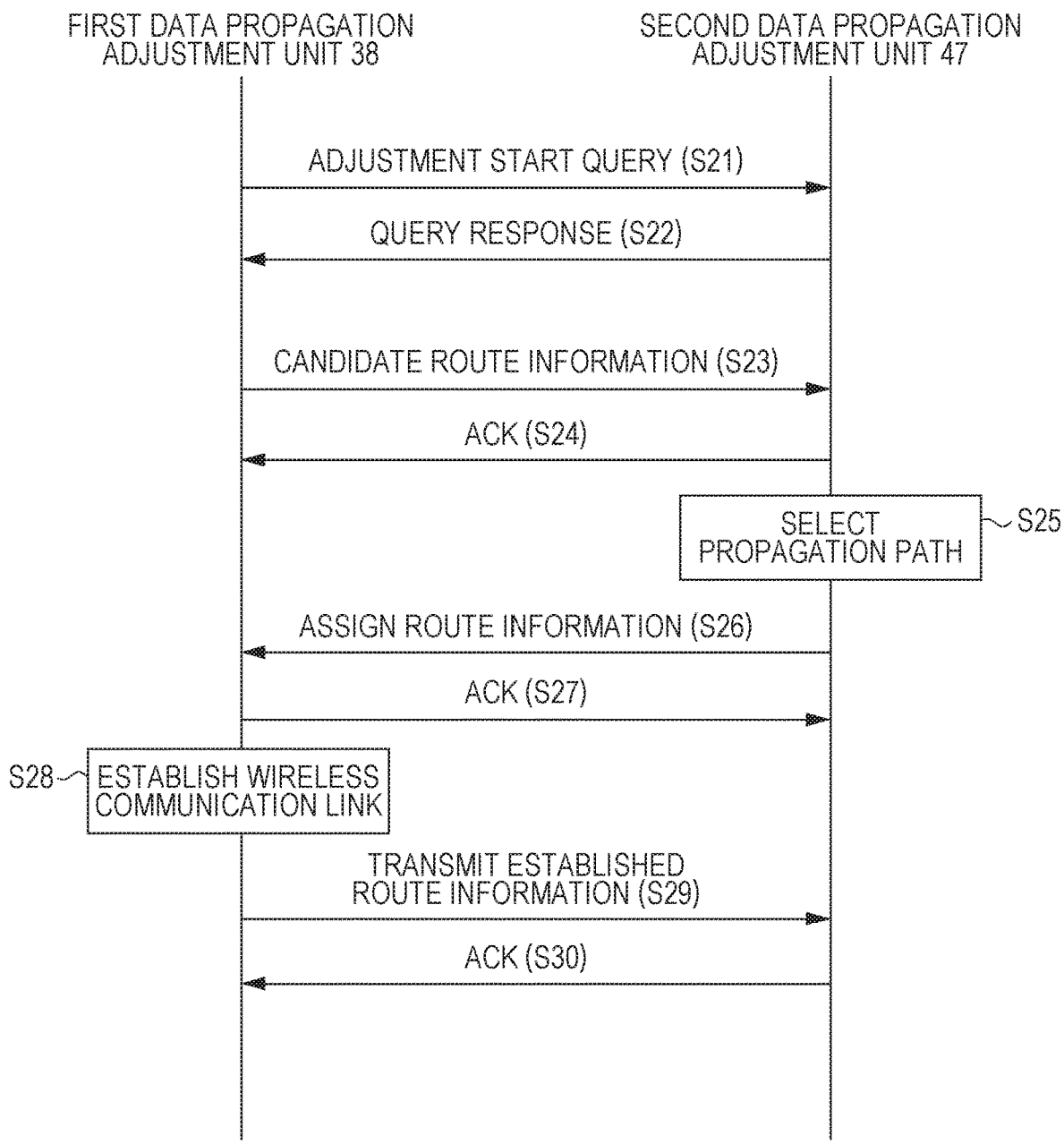
FIG. 8 is a diagram illustrating a sequence of adjusting a propagation path between a first data propagation adjustment unit 8 and a second data propagation adjustment unit.

FIG. 8 illustrates a propagation path adjustment sequence between the first data propagation adjustment unit 38 and the second data propagation adjustment unit 47.

The first data propagation adjustment unit 38 which is to transmit data first transmits an adjustment start query (step S21). The second data propagation adjustment unit 47 which receives the adjustment start query returns a query response to the first data propagation adjustment unit 38 in response to the reception when adjustment start is executable.

When receiving the query response, the first data propagation adjustment unit 38 transmits candidate route information to the second data propagation adjustment unit 47 (step S23). The candidate route information describes one or more candidate propagation paths for transmitting data therein. The second data propagation adjustment unit 47 which receives the candidate route information transmits ACK to the first data propagation adjustment unit 38 (step S24).

The second data propagation adjustment unit 47 selects one propagation path from among the propagation paths included in the candidate route information in step S25. The second data propagation adjustment unit 47 selects the propagation path on the basis of whether the route is accessible only by the company and its associated company.

The second data propagation adjustment unit 47 then transmits assignment of the route information describing its selected propagation path therein to the first data propagation adjustment unit 38 (step S26). When receiving the assignment of the route information, the first data propagation adjustment unit 38 transmits ACK to the second data propagation adjustment unit 47 (step S27).

The processing then proceeds to step S28, where the first data propagation adjustment unit 38 establishes a wireless communication link between the FSM 2 and the FM 4 for the propagation path assigned in step S26. The processing then proceeds to step S29, where the first data propagation adjustment unit 38 transmits the information on the propagation path for which the wireless communication link is established to the second data propagation adjustment unit 47. When receiving the information, the second data propagation adjustment unit 47 transmits ACK to the first data propagation adjustment unit 38.

Additionally, a propagation path between the second data propagation adjustment unit 47 and the third data propagation adjustment unit 67 is also established in a similar procedure.

According to the present invention, even if the detected information control unit 30 determines the acquisition non-intended information as the acquisition position information, a propagation path for the data including the information is adjusted by the first data propagation adjustment unit 38, the second data propagation adjustment unit 47, and the third data propagation adjustment unit 67, thereby preventing the information from being leaked to the outside.

Thus, according to the present invention, it is possible to prevent the acquisition non-intended information from being leaked to the outside in two stages, or in the detected information control unit 30 and in the first data propagation adjustment unit 38, the second data propagation adjustment unit 47, and the third data propagation adjustment unit 67.

Additionally, it is necessary to determine whether the acquisition position information is included in data to be transmitted when the first data propagation adjustment unit 38, the second data propagation adjustment unit 47, and the third data propagation adjustment unit 67 perform the above operations. In such a case, the first data propagation adjustment unit 38, the second data propagation adjustment unit 47, and the third data propagation adjustment unit 67 analyze the data itself or its tagged information, and specify the category of the information to be transmitted. Then, how to transmit the information by use of which communication device (the FSM 2, the FM 4, or the SM 6) is determined according to the service policy per specified category or the communication system selection policy depending on the radio environment.

Further, with the equipment management system 1 according to the present invention, various items of information measured from the equipment 15 by the normal measurement unit 23 or the event measurement unit 24 are statistically analyzed, and the analysis result may be reflected on controlling the equipment 15 or setting the communication conditions.

Actually, various items of information measured from the equipment 15 by the normal measurement unit 23 or the event measurement unit 24 are statistically analyzed in cooperation with the FM 4, and if necessary the SM 6, not only the FSM 2. Exemplary statistical analysis in the FM 4 will be described below.

The measured information is sent to the communication interface 27 via the information processing unit 32, the local service quality manager 28, the network access unit 34, the first data propagation adjustment unit 38, and the like. The communication interface 27 transmits the information sent thereto to the communication interface 41 in the FM 4 via wireless communication. The information is sent to the global communication manager 52 via the second data propagation adjustment unit 47 and the network access unit 49. The global communication manager 52 statistically analyzes the information transmitted thereto.

Figure 9:
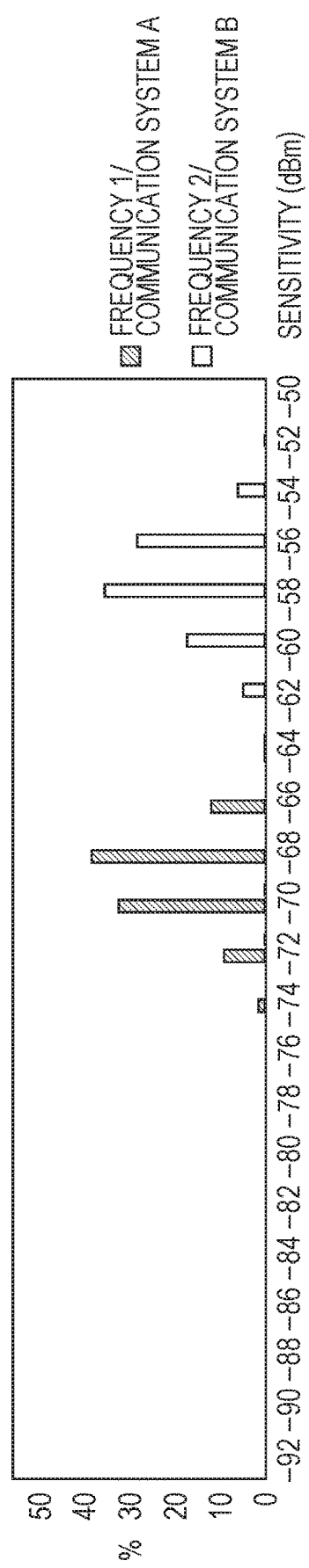
FIG. 9 is a diagram illustrating exemplary statistical analysis made by the equipment management system according to the present invention.

For example, when the sent information is the intensity of a signal received from the equipment 15, a distribution of sensitivities (dBm) may be statistically analyzed as illustrated in FIG. 9. If such a statistical analysis is actually made, data acquisition one time is not enough, and the analysis method needs to be changed depending on the situation, and thus the information needs to be acquired several times, accumulated, and analyzed.

As a result of actual statistical analysis, the statistical distribution as illustrated in FIG. 9 is found, and then the global communication manager 52 makes various determinations on the basis of the statistical distribution. As a kind of the determination, the rate of the sensitivities over a predetermined value illustrated in FIG. 9 is found, and a determination is made as to whether the rate is a threshold or more.

The global communication manager 52 then determines how to control the equipment 15 or whether to make communication under which communication condition depending on the determination result. The control policy is included in the local service policy and the local communication policy to be transmitted to the FSM 2. The transmission route is reverse to the route in which the information is sent.

The FSM 2 controls the equipment 15 or sets the communication conditions on the basis of the local service policy and the local communication policy on which the control policy is reflected. Thereby, the statistical analysis result based on the information detected from the equipment 15 can be reflected on controlling the equipment 15 or setting the communication conditions.

Additionally, the statistical analysis and determination as well as the determination of a new control policy or communication conditions may be completed in the FSM 2. In such a case, the local service quality manager 28 mainly performs the operations.

Figure 10:
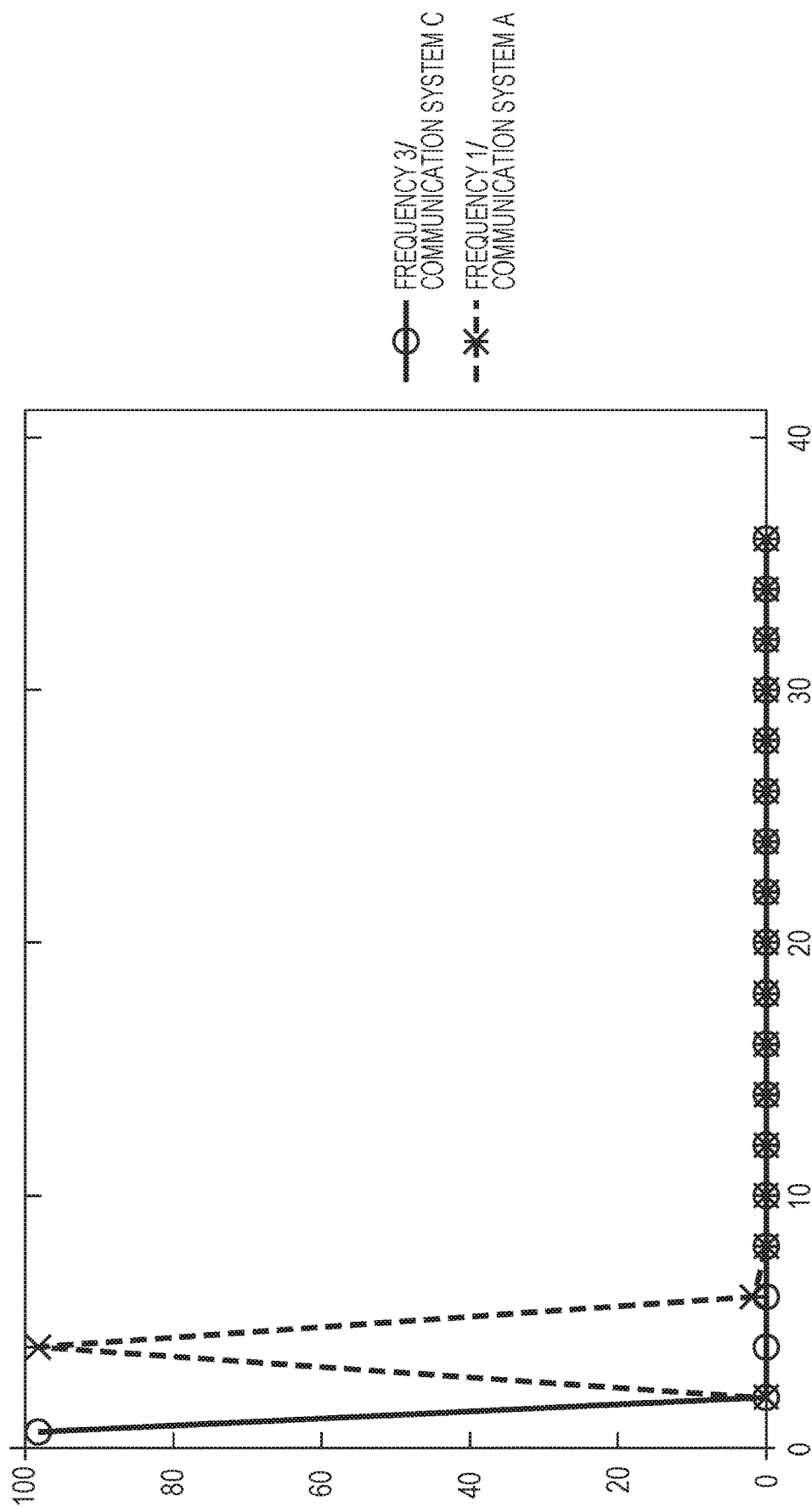
FIG. 10 is a diagram illustrating other exemplary statistical analysis made by the equipment management system according to the present invention.

Additionally, the statistical analysis is not limited to the above example. For example, as illustrated in FIG. 10, the rate of delay time of packet may be statistically analyzed. In FIG. 10, the horizontal axis indicates a delay time of packet, and the vertical axis indicates its rate. It is indicated that 98% of the packets delay by 0.4 ms in frequency 3 and communication system C, while 98% of the packets delay by 4 ms in frequency 1 and communication system A. Also in such a case, it is of course possible to previously set the threshold of the rate relative to the delay amount and to adjust the control policy or communication conditions of the equipment 15 depending on whether the threshold is exceeded.

Statistical analysis may be made for a variation in reception intervals in addition to the delay time or signal intensity, for example, and analysis may be made on the basis of any statistical item such as long-time average, maximum value and minimum value, standard deviation, and dispersion. Further, any item based on the information detected from the equipment 15 to be analyzed may be statistically analyzed.

The control function of the equipment 15 depending on the statistical analysis result is effectively used thereby to propose an improvement in the working steps in the equipment 15 installed in the plant, and consequently in the entire plant, and to manage equipment 15 newly on the basis of the proposed improvement option. For example, an impact of control change in the equipment 15 or failure in the equipment 15 on productivity is statistically analyzed to promote the client to stop the equipment 15 or to replace a consumable on the basis of the statistical analysis, which can be led to keep and improve productivity.

REFERENCE SIGNS LIST

1: Equipment management system
2: FSM
4: FM
6: SM
8: Cloud
15: Equipment
21: System controller
22: System measurement unit
23: Normal measurement unit
24: Event measurement unit
25: Local communication controller
26: Communication measurement unit
27: Communication interface
28: Local service quality manager
29: System control unit
30: Detected information control unit
31: Buffer
32: Information processing unit
34: Network access unit
35: Terminal communication determination unit
36: Local communication manager
37: Terminal measurement manager
38: First data propagation adjustment unit
39: Buffer
41: Communication interface
42: Local communication policy controller
43: Field communication controller
44: Normal measurement unit
45: Event measurement unit
46: Field measurement controller
47: Second data propagation adjustment unit
48: Buffer
49: Network access unit
50: Field communication policy determination unit
51: Local communication policy determination unit
52: Global communication manager
53: Information processing unit
61: Communication interface
62: Service policy controller
63: Communication controller
66: Service quality measurement controller
67: Third data propagation adjustment unit
68: Buffer
69: Network access unit
70: Communication manager
71: Communication network determination unit
72: Global service quality manager
73: Information processing unit
74: Service policy determination unit
80: Server
101: Service quality evaluation unit
102: Manufacture process monitoring unit
103: Risk evaluation unit
104: Financial evaluation unit
105: Data access control unit
FIG. 1
15: EQUIPMENT
15: EQUIPMENT
15: EQUIPMENT
15: EQUIPMENT
15: EQUIPMENT
15: EQUIPMENT 15: EQUIPMENT
15: EQUIPMENT
PLANT
8: CLOUD
80a: SERVER
80b: SERVER
80n: SERVER
COMMUNICATION NETWORK
FIG. 2
15: EQUIPMENT
21: SYSTEM CONTROLLER
29: SYSTEM CONTROL UNIT
31: BUFFER
30: DETECTED INFORMATION CONTROL UNIT
32: INFORMATION PROCESSING UNIT
28: LOCAL SERVICE QUALITY MANAGER
23: NORMAL MEASUREMENT UNIT
24: EVENT MEASUREMENT UNIT
22: SYSTEM MEASUREMENT UNIT
25: LOCAL COMMUNICATION CONTROLLER
35: TERMINAL COMMUNICATION DETERMINATION UNIT
36: LOCAL COMMUNICATION MANAGER
37: TERMINAL MEASUREMENT MANAGER
34: NETWORK ACCESS UNIT
39: BUFFER
38: FIRST DATA PROPAGATION ADJUSTMENT UNIT
26: COMMUNICATION MEASUREMENT UNIT
27: COMMUNICATION INTERFACE
FIG. 3
ALL DETECTED INFORMATION
ACQUISITION INTENDED INFORMATION (SUCH AS NOISES OF MOTOR OR THE NUMBER OF VIBRATIONS OF EQUIPMENT INSTRUCTED TO ACQUIRE BY CLIENT)
ACQUISITION NON-INTENDED INFORMATION (ALL INFORMATION EXCEPT ACQUISITION INTENDED INFORMATION)
FIG. 4
42: LOCAL COMMUNICATION POLICY CONTROLLER
43: FIELD COMMUNICATION CONTROLLER
51: LOCAL COMMUNICATION POLICY DETERMINATION UNIT
50: FIELD COMMUNICATION POLICY DETERMINATION UNIT
48: BUFFER
52: GLOBAL COMMUNICATION MANAGER
49: NETWORK ACCESS UNIT
47: SECOND DATA PROPAGATION ADJUSTMENT UNIT
53: INFORMATION PROCESSING UNIT
46: FIELD MEASUREMENT CONTROLLER
44: NORMAL MEASUREMENT UNIT
45: EVENT MEASUREMENT UNIT
41: COMMUNICATION INTERFACE
27: COMMUNICATION INTERFACE
34: NETWORK ACCESS UNIT
38: FIRST DATA PROPAGATION ADJUSTMENT UNIT
FIG. 5
42: LOCAL COMMUNICATION POLICY CONTROLLER
43: FIELD COMMUNICATION CONTROLLER
51: LOCAL COMMUNICATION POLICY DETERMINATION UNIT
50: FILED COMMUNICATION POLICY DETERMINATION UNIT
48: BUFFER
52: GLOBAL COMMUNICATION MANAGER
49: NETWORK ACCESS UNIT
47: SECOND DATA PROPAGATION ADJUSTMENT UNIT
53: INFORMATION PROCESSING UNIT
46: FIELD MEASUREMENT CONTROLLER
44: NORMAL MEASUREMENT UNIT
45: EVENT MEASUREMENT UNIT
41: COMMUNICATION INTERFACE
61: COMMUNICATION INTERFACE
63: COMMUNICATION CONTROLLER
62: SERVICE POLICY CONTROLLER
68: BUFFER
71: COMMUNICATION NETWORK DETERMINATION UNIT
74: SERVICE POLICY DETERMINATION UNIT
67: THIRD DATA PROPAGATION ADJUSTMENT UNIT
69: NETWORK ACCESS UNIT
70: COMMUNICATION MANAGER
72: GLOBAL SERVICE QUALITY MANAGER
73: INFORMATION PROCESSING UNIT
66: SERVICE QUALITY MEASUREMENT CONTROLLER
FIG. 6
62: SERVICE POLICY CONTROLLER
63: COMMUNICATION CONTROLLER
74: SERVICE POLICY DETERMINATION UNIT
101: SERVICE QUALITY EVALUATION UNIT
102: MANUFACTURE PROCESS MONITORING UNIT
103: RISK EVALUATION UNIT
104: FINANCIAL EVALUATION UNIT
105: DATA ACCESS CONTROL UNIT
72: GLOBAL SERVICE QUALITY MANAGER
71: COMMUNICATION NETWORK DETERMINATION UNIT
70: COMMUNICATION MANAGER
69: NETWORK ACCESS UNIT
73: INFORMATION PROCESSING UNIT
66: SERVICE QUALITY MEASUREMENT CONTROLLER
8: CLOUD
80a: SERVER
80b: SERVER
80n: SERVER
FIG. 7
(S11) QUERY
(S12) RESPONSE
(S13) TRANSMIT INFORMATION
(S14) TRANSMIT POLICY
FIG. 8
FIRST DATA PROPAGATION ADJUSTMENT UNIT 38
SECOND DATA PROPAGATION ADJUSTMENT UNIT 47
(S21) ADJUSTMENT START QUERY
(S22) QUERY RESPONSE
(S23) CANDIDATE ROUTE INFORMATION
S25: SELECT PROPAGATION PATH
(S26) ASSIGN ROUTE INFORMATION
S28: ESTABLISH WIRELESS COMMUNICATION LINK
(S29) TRANSMIT ESTABLISHED ROUTE INFORMATION
FIG. 9
FREQUENCY 1/COMMUNICATION SYSTEM A
FREQUENCY 2/COMMUNICATION SYSTEM B
SENSITIVITY

FIG. 10
FREQUENCY 3/COMMUNICATION SYSTEM C
FREQUENCY 1/COMMUNICATION SYSTEM A

The invention claimed is:

1. An equipment management system comprising:
an adaptive system control unit which is assigned to at least one piece of equipment installed in a plant and which monitors and controls the at least one piece of equipment via wireless communication;
a field manager which is assigned in units of plant and manages at least one adaptive system control unit; and
a service manager for managing at least one field manager, wherein the service manager performs a service including guaranteeing quality and protecting information based on a contract with the client,
wherein:
the adaptive system control unit:
   detects information from the at least one piece of equipment,
   guarantees that only acquisition intended information which is previously intended to be acquired in the detected information is acquired by the adaptive system control unit, and erases acquisition non-intended information,
   selects a propagation path when transmitting data including information controlled by guaranteeing of the adaptive system control unit, to outside the plant, and
   controls the at least one piece of equipment based on a local service policy in which the adaptive system control unit controls the equipment in consideration of the service quality, the local service policy is transmitted from the field manager;
the field manager:
   selects a propagation path for the data transmitted to an adaptive system control unit under control of the field manager,
   acquires operation information in units of plant,
   generates the local service policy based on a service policy transmitted from the service manager, and the operation information of the equipment in the plant, and
   transmits the local service policy to the adaptive system control unit; and
the service manager:
   selects a propagation path for the data transmitted to a field manager under control of the service manager,
   generates the service policy for performing the service, the service policy including the acquisition intended information, and
   transmits the service policy to the field manager.

2. The equipment management system according to claim 1, wherein the service manager sets the information which is previously intended to be acquired, and includes the information in the service policy to be transmitted to the field manager.

3. The equipment management system according to claim 2, wherein when the information detected by the adaptive system control unit is other than the information which is previously intended to be acquired, the adaptive system control unit does not transmit the information to the outside.

4. The equipment management system according to claim 3,
   wherein the adaptive system control unit statistically analyzes the information detected by the adaptive system control unit, and
   wherein the adaptive system control unit controls the at least one equipment based on the analysis result, or sets a condition for making communication with the at least one equipment.

5. The equipment management system according to claim 2,
   wherein the adaptive system control unit statistically analyzes the information detected by the adaptive system control unit, and
   wherein the adaptive system control unit controls the at least one equipment based on the analysis result, or sets a condition for making communication with the at least one equipment.

6. The equipment management system according to claim 1, wherein when the information detected by the adaptive system control unit is other than the information which is previously intended to be acquired, the adaptive system control unit does not transmit the information to the outside of the plant.

7. The equipment management system according to claim 6,
   wherein the adaptive system control unit statistically analyzes the information detected by the adaptive system control unit, and
   wherein the adaptive system control unit controls the at least one equipment based on the analysis result, or sets a condition for making communication with the at least one equipment.

8. The equipment management system according to claim 1,
   wherein the adaptive system control unit statistically analyzes the information detected, and
   wherein the adaptive system control unit controls the at least one equipment based on the analysis result, or sets a condition for making communication with the at least one equipment.

* * * * *